United States Patent [19]
Padgett

[11] 3,828,135
[45] Aug. 6, 1974

[54] ARRANGEMENT FOR ASSEMBLING AN INITIAL ENTRY IN A BILLING BUFFER

[75] Inventor: Richard A. Padgett, Lombard, Ill.

[73] Assignee: GTE Automatic Electric Laboratories Incorporated, Northlake, Ill.

[22] Filed: Jan. 2, 1973

[21] Appl. No.: 320,214

[52] U.S. Cl. .............................................. 179/7 R
[51] Int. Cl. ........................................ H04m 15/10
[58] Field of Search .......... 179/7 R, 7.1 TP, 7 MM, 179/7.1 R, 9; 178/2 F

[56] References Cited

UNITED STATES PATENTS

| | | | |
|---|---|---|---|
| 3,001,021 | 9/1961 | Wright et al. | 179/7 MM |
| 3,160,709 | 12/1964 | Burke | 179/7 MM |
| 3,283,078 | 11/1966 | Avery | 179/9 |
| 3,312,947 | 4/1964 | Raspanti | 179/7 |
| 3,673,333 | 6/1972 | Le Strat et al. | 179/7 R |

*Primary Examiner*—Kathleen H. Claffy
*Assistant Examiner*—Gerald L. Brigance

[57] ABSTRACT

In the described centralized automatic message accounting system, a multi-entry format formed of an intial entry, an answer entry and a disconnect entry is used to record call records. The data comprising the initial entry is accumulated in two different parts of the system, with some data being stored in a call processor call store and some data being stored in an initial entry pre-store. An arrangement is disclosed for assembly the data from these two sources into a billing buffer, to complete one initial entry.

2 Claims, 5 Drawing Figures

CALL STORE MEMORY LAYOUT

ARRANGEMENT FOR ASSEMBLING AN INITIAL ENTRY IN A BILLING BUFFER

This invention relates to a centralized automatic message accounting system. More particularly, it relates to a method and arrangement for assembling an initial entry in the billing buffer, in such a system.

The centralized automatic message accounting system uses a multi-entry format for recording call records. That is, one call record comprises three separate entries: an initial entry, an answer entry, and a disconnect entry. The initial entry identifies who is to be billed and at what rate. The remaining two entries specify the length of the call.

The data comprising the initial entry is accumulated in two different parts of the system, with some data being stored in a call processor call store and some data being stored in an initial entry pre-store. The call store data is contained in five words, and the pre-store data is contained in three words and provides the time the call was placed and identifies its data as part of the initial entry. These eight words from these two sources are assembled in the billing buffer to complete one initial entry.

Accordingly, it is an object of the present invention to provide an improved automatic message accounting system.

More particularly, it is an object to provide a method and arrangement for assembling an initial entry in the billing buffer, in such a system.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
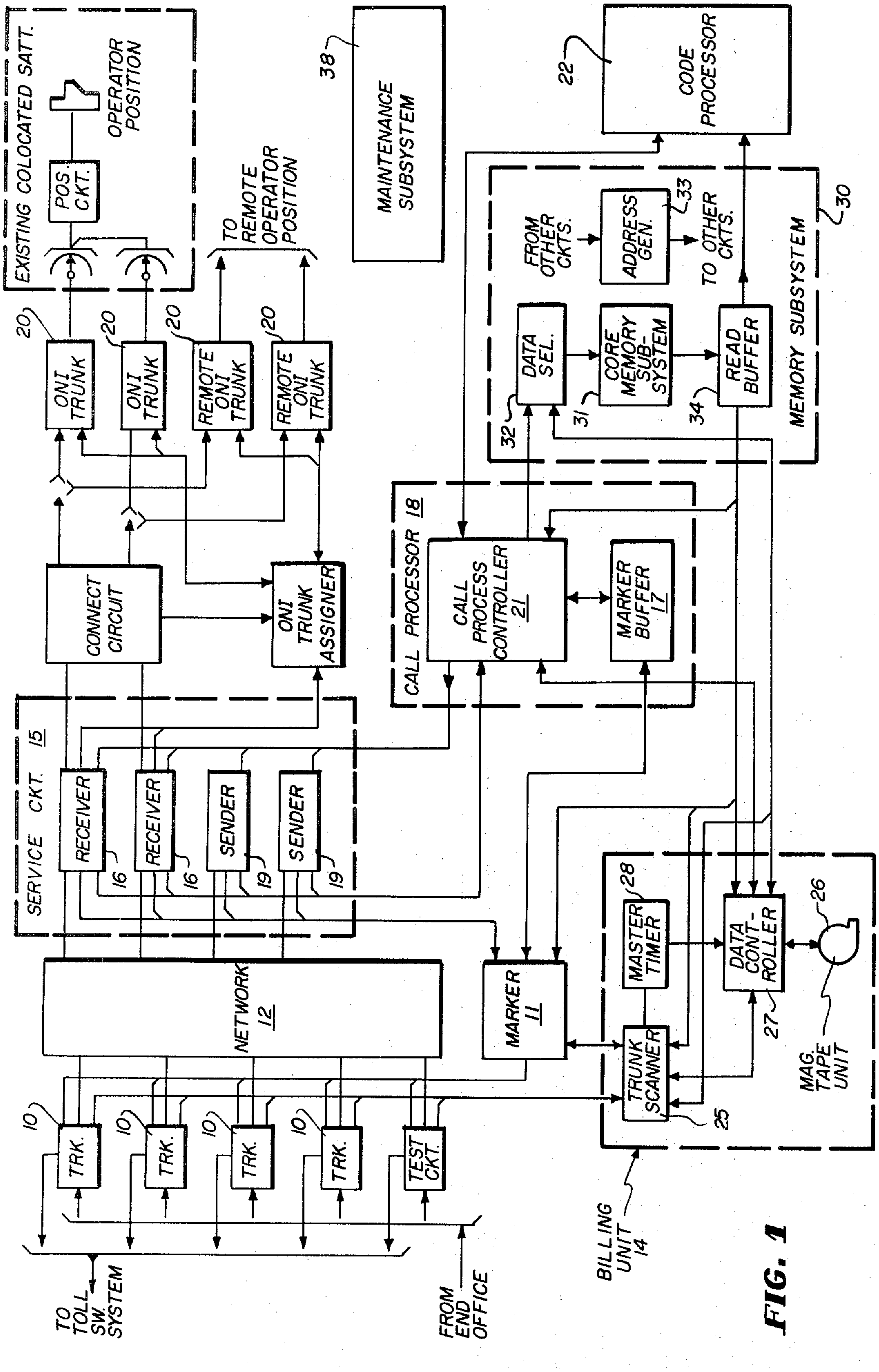
FIG. 1 is a block diagram schematic of the centralized automatic message accounting system.

Referring now to the drawings, in FIG. 1 the centralized automatic message accouting system is illustrated in block diagram, and the functions of the principal equipment elements can be generally described as follows. The trunks 10, which may be either multi-frequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores at a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has 8 rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to 4 prefix digits if required, or provide delete information pertinent to the called number. If the call processor controller 21 determined that the call is an ANI call, it will receive, accumulate and store the calling number in the same manner as was done with the called number. After the call process controller 21 receives "ST," it will request the billing unit 14 for storage of an initial entry in the billing unit memory. It will also command the receiver 16 to drop the trunk to receiver connection. The call processor controller 21 now initiates a request to the marker 11 via marker buffer 17 for a trunk to sender connection. Once the maker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST." The call process controller 21 will control the duration of tones and interdigital pause. After sending of "ST," the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries. The data controller 27 in the billing unit 14 accumulates, organizes and routes data from other circuits within the system in order to produce this permanent record of billing information. The initial entry portion of the multi-entry format is accumulated in two different parts of the system, with some being stored in the call stores of the call processor 18 and some being stored in an initial entry pre-store 41 (FIG. 2) of the data controller 27. The answer and disconnect (or forced disconnect) entries are provided by the trunk scanner 25.

Figure 2:
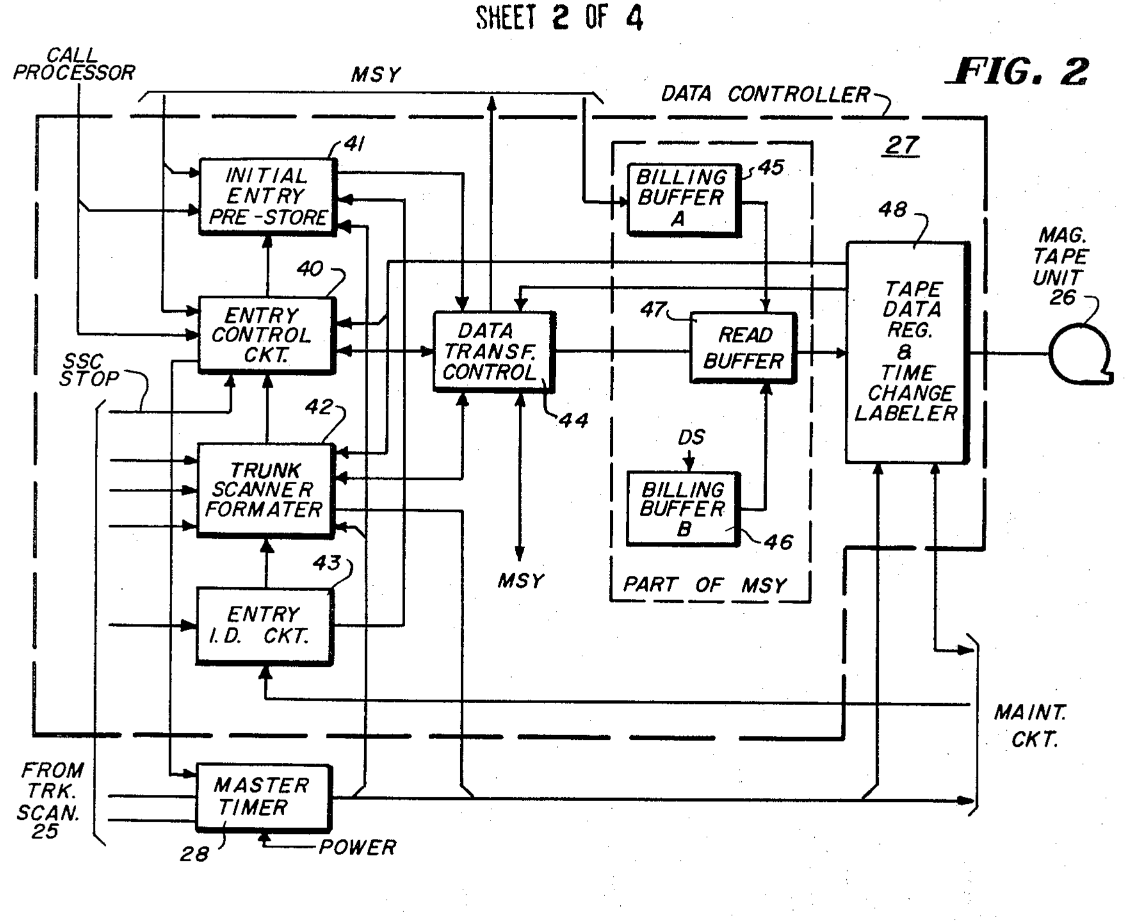
FIG. 2 is a block diagram schematic of the data controller.

The data controller 27 is shown in block diagram in FIG. 2 and can be seen to include the initial entry pre-store 41. The call processor 18 does not provide all the data required for a complete initial entry. Three words must be added which are registered in this initial entry pre-store 41. These words contain the initial entry identifier and the time existing when the request for entry was accepted by the entry control circuit 40.

The trunk scanner formater 42 stores entries from the trunk scanner 25, with data for the entries being supplied by the trunk scanner 25, the master timer 28 and the entry identification circuit 43.

The entry identification circuit 43 receives an indication of the type of entry required from the trunk scanner 25. As soon as the entry required is specified, the entry identification circuit 43 gates the proper entry identification digits to the trunk scanner formater 42 for storage.

The data transfer control 44 transfer data from the trunk scanner formater 42 and the initial entry prestore 41 to the billing buffer 45, or 46, depending upon which of the two is in the WRITE mode.

The tape data register 48 is comprised of circuits to insure the proper flow of data to the magnetic tape unit 26, as the data is being taken out of the billing buffer 45, or 46, to be recorded on tape.

The entry control circuit 40 includes a service distributor (not shown) which determines whether an initial entry request or a trunk scanner entry will be honored by the entry control circuit 40. Calls for initial entries (CFDR) from the call processor 18 will occur during a row word pulse one (RWP1) which is a preestablished timing interval, if an entry is required. The service distributor will allow the CFDR, if a trunk scanner entry is not being handled when the CFDR is requested. The CFDR's will be monitored during RWP1 from time slots TX4 to TX6. If an initial entry is not requested during this time interval, the service distributor returns to the task of monitoring calls from the trunk scanner formater 42.

Although the service distributor monitors calls for entries continuously, the entry control must be idle before the call is accepted. When a call is accepted, a service selector 51 (FIG. 5) within the entry control circuit 40 returns a command to the requesting circuit to signify that it has access to the billing buffer and the entry can be written into memory. A command is also sent forward to the data transfer control 44 so that either the initial entry pre-sotre 41 or the trunk scanner formater 42 can be connected to the billing buffer.

Initially, the data transfer control 44 will be set with one of the two billing buffers 45 and 46 in the WRITE mode and the other idle. All requests for billing entries are processed in the entry control circuit 40. The latter accepts requests for entries as soon as one billing buffer is ready to store call records.

Requests for initial entire originate in the call processor 18. If requests are being accepted, and the entry control is idle, the request will be served. When the request is accepted, notification is returned to the call processor 18 that it has access to the billing unit 14. The service selector 51 sends a serve register SR signal to the data transfer control 44 to connect the initial entry pre-store 41 to the memory data selector bus 81. The data transfer control 44 confirms that the bus is connected by returning a signal that the data can be written into memory.

The requests for answer and disconnect entries originate in the trunk scanner 25. If requests are being accepted and the entry control circuit 40 is idle, the request will be served. When the request is accepted, the service selector 51 sends a command SS forward to the data transfer control 44 to connect trunk scanner formater 42 to the memory data selector bus. Confirmation that the bus is connected is returned from the data transfer control 44.

Figure 3:
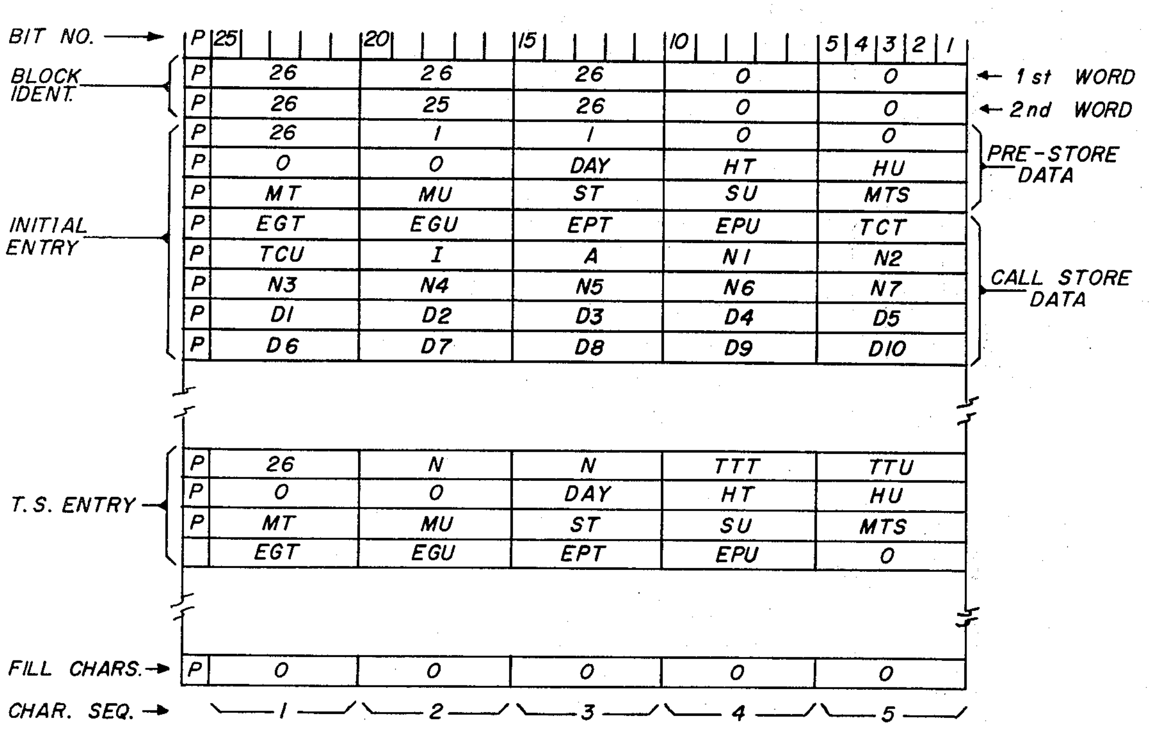
FIG. 3 illustrates the memory layout or format of the billing buffer.

Referring now to FIG. 3, the billing buffer layout or format in the memory is shown, and it can be seen that the three words of pre-store data precede the five words of call store data, in the format of the initial entry. This data is arranged in this order to conform to the magnetic tape format specified for the system. The data stored in the billing buffer is written on the magnetic tape exactly as it appears in the billing buffer, with each character in each word being written on the magnetic tape in order from left to right, as shown in FIG. 3.

Figure 4:
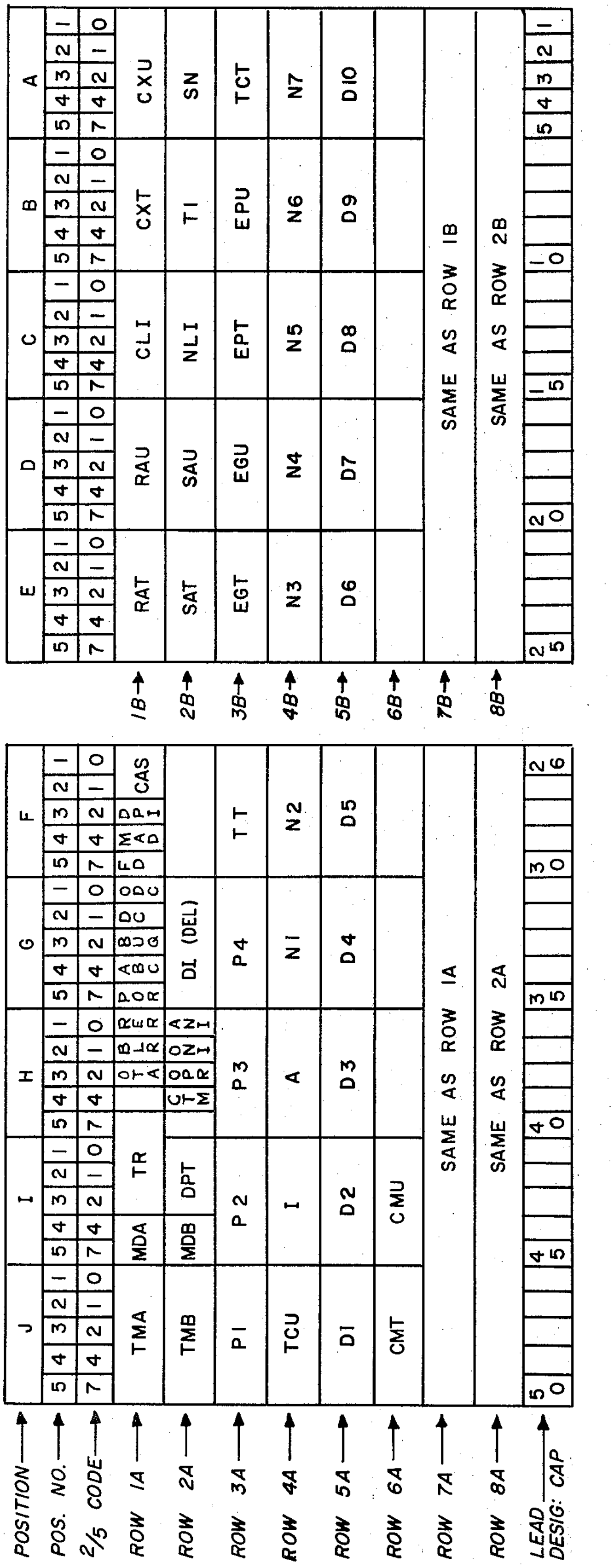
FIG. 4 illustrates the memory layout or format of a call store.

The call store memory layout or format is shown in FIG. 4, and it can be seen that the call store data written into the billing buffer is contained only in call store word rows 3B, 4A, 4B, 5A and 5B. These five call store words and the three words of pre-store data are assembled in the billing buffer to complete one initial entry, as follows.

Figure 5:
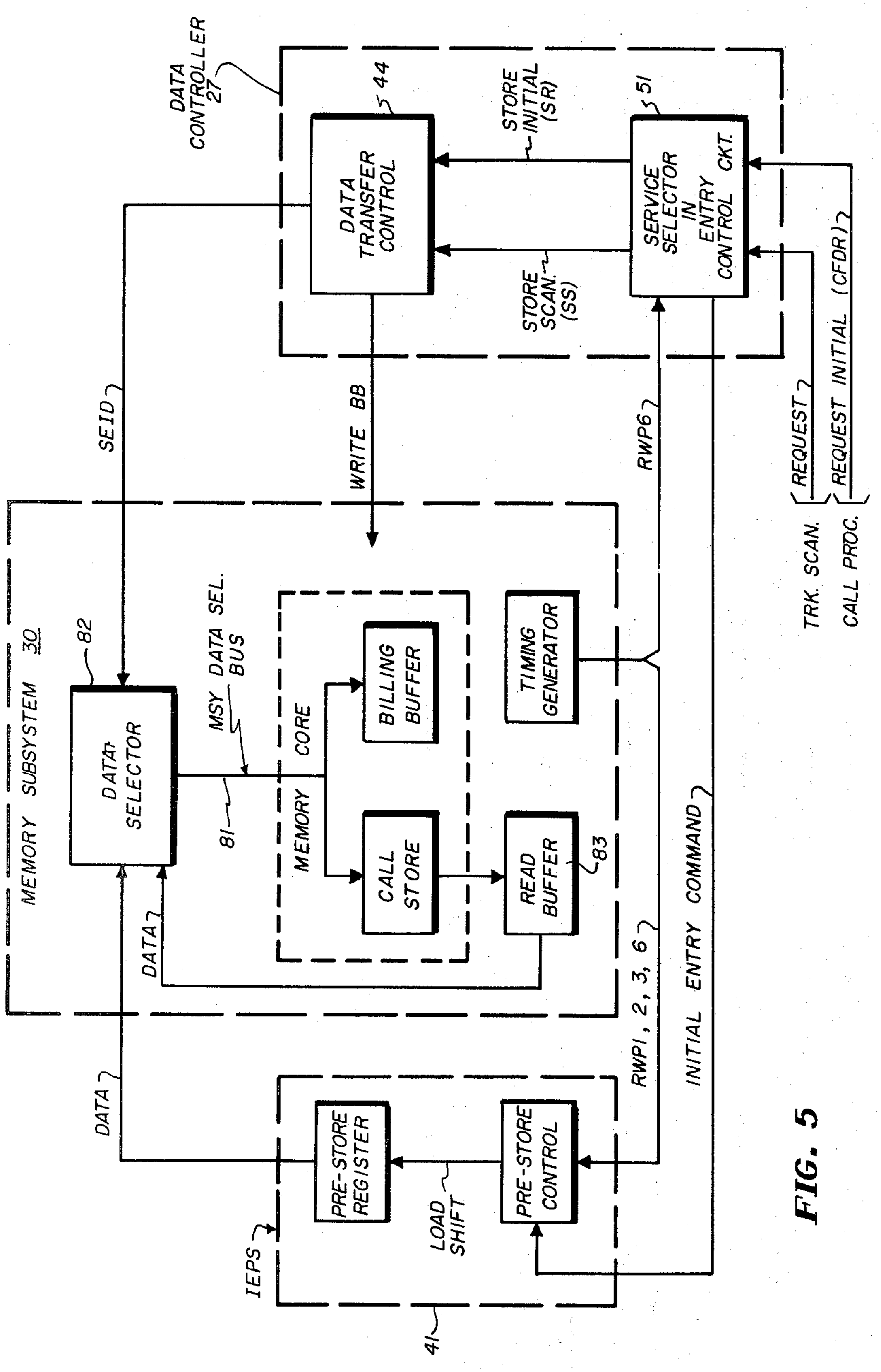
FIG. 5 is a block diagram schematic illustrating the manner in which the initial entry is assembled in the billing buffer.

Referring now to FIG. 5, when the call processor 18 has stored all data pertinent to a call in the call store and is ready to forward data to the billing unit 14, it requests access to the billing buffer while the first word (RWP1) of the call store is being read. When this request is accepted by the entry control circuit 40, notification is returned to the call processor 18 that it has access to the billing unit. A command SR is also forwarded to the data transfer control 44 to connect the initial entry pre-store 41 to the memory data selector bus 81, all as described above. The first three words of the entry are registered in the initial entry pre-store 41 during RWP1.

Since the call store data is contained only in call store words 3B, 4A, 4B, 5A and 5B, the pre-store data can be transferred into the billing buffer during the times allotted to row words 2A, 2B and 3A.

The data transfer control 44 supplies a command SEID (scanner entry identity) to the data selector 82 of the memory subsystem 30 to specify the kind of entry that is to be stored in the billing buffer. The command SEID means a trunk scanner entry and $\overline{SEID}$ means an initial entry.

When $\overline{SEID}$ is supplied to the data selector 82, the initial entry pre-store 41 is loaded during RWP1. During RWP2A, 2B and 3A, the data selector 82 accepts data from the initial entry pre-store 41. When RWP3B occurs, and because the data transfer control 44 is signaling $\overline{SEID}$ indicating an initial entry, the data selector 82 accepts data from the call store read buffer 83 and disconnects the data selector bus from the initial entry pre-store 41. In this manner, the pre-store data is always stored in the billing buffer ahead of the call store data, to provide the proper format for writing on the magnetic tape. The billing buffer is always dumped to the magnetic tape, from top to bottom and left to right.

During the direct memory transfer of call store data to the billing buffer, the data is read first from the call store into its read buffer 83. While the data is in the read buffer 83, a billing buffer WRITE interval occurs, causing the contents of the read buffer 83 to be transferred into the billing buffer via the data selector 82. This process continues as long as the WRITE interval exists (WRITE BB is true) and SEID is false from the data transfer control 44. When RWP6 occurs, WRITE BB is removed because the entire initial entry has been stored in the billing buffer.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a communication system using a multi-entry format including an initial entry, an answer entry and a disconnect entry for recording call records, the data comprising the initial entry being accumulated by a call processor and stored in a call processor call store and an initial entry pre-store, said data from said call processor call store and said initial entry pre-store being assembled in a billing buffer to complete one initial entry, said system comprising a core memory having one portion thereof which forms at least one call processor call store and another portion thereof which forms said billing buffer, an initial entry pre-store, a data bus, a call store read buffer, and a data selector, said data selector being operable during a first pre-established time interval to couple said initial entry pre-store to said data bus to permit the data stored therein to be transferred into said billing buffer, the data stored in said call processor call store being read into said call store billing buffer during the time interval said data is being transferred from said initial entry pre-store into said billing buffer, said data selector being operable during a subsequent second time interval to couple said call store read buffer to said data bus to permit the call store data stored therein to be transferred into said billing buffer, and control means for establishing said first and second pre-established time intervals.

2. In a communication system using a multi-entry format including an initial entry, an answer entry and a disconnect entry for recording call records, the data comprising the initial entry pre-store being assembled in a billing buffer to complete one initial entry, said system comprising an initial entry pre-sotre, a data bus, a call store read buffer, and a data selector, said data selector being operable during a first pre-established time interval to couple said initial entry pre-sotre to said data bus to permit the data stored therein to be transferred into said billing buffer, the data stored in said call processor call store being read into said call store billing buffer during the time interval said data is being transferred from said initial entry pre-sotre into said billing buffer, said data selector being operable during a subsequent second time interval to couple said call store read buffer to said data bus to permit the call store data stored therein to be transferred into said billing buffer, and control means for establishing said first and second preestablished time intervals, said call processor upon storing all data pertinent to a call in said call processor call store requesting access to said billing buffer while the first word stored in said call store is read, said initial entry pre-sotre being coupled to said data bus and said data stored therein being transferred into said billing buffer during the time allotted to read three additional words stored in said call processor call store, said initial entry pre-store being disconnected from and said call processor read buffer being coupled to said data bus when the data stored in said initial entry pre-store has been transferred into said billing buffer to permit the data stored in said call store read buffer to be transferred into said billing buffer.

* * * * *

UNITED STATES PATENT OFFICE
CERTIFICATE OF CORRECTION

Patent No. 3,828,135 Dated August 6, 1974

Inventor(s) RICHARD A. PADGETT

It is certified that error appears in the above-identified patent and that said Letters Patent are hereby corrected as shown below:

Column 8, line 40, after "entry" insert -- being accumulated by a call processor and stored in a call processor call store and an initial entry pre-store, said data from said call processor call store and said initial entry -- line 42, "pre-sotre" should be -- pre-store -- line 45, "pre-sotre" should be -- pre-store -- line 49, "pre-sotre" should be -- pre-store -- line 59, "pre-sotre" should be -- pre-store --

Signed and sealed this 29th day of October 1974.

(SEAL)
Attest:

McCOY M. GIBSON JR.
Attesting Officer

C. MARSHALL DANN
Commissioner of Patents